US006221304B1

(12) United States Patent
Harris et al.

(10) Patent No.: US 6,221,304 B1
(45) Date of Patent: *Apr. 24, 2001

(54) METHOD OF MANUFACTURING A FILM COATED ARTICLE

(75) Inventors: Mark Alan Harris, Dexter; Zinoviy Chernyak, Farmington Hills, both of MI (US)

(73) Assignee: Visteon Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,523

(22) Filed: Jul. 30, 1997

(51) Int. Cl.⁷ .................................................. B29C 45/14
(52) U.S. Cl. ........................ 264/511; 264/267; 264/275; 425/126.1; 425/127; 425/129.1
(58) Field of Search .................................. 264/511, 513, 264/266, 267, 269, 275; 425/126.1, 444, 129.1, 127

(56) References Cited

U.S. PATENT DOCUMENTS

| 3,619,858 | 11/1971 | Sutch . |
| 3,668,034 | 6/1972 | Nicholas et al. . |
| 3,973,888 | * 8/1976 | Hehl ................................. 425/126.1 |
| 4,136,150 | 1/1979 | Darnall, Jr. . |
| 4,576,560 | * 3/1986 | Herman .......................... 425/126.1 |
| 4,650,533 | 3/1987 | Parker et al. . |
| 4,769,100 | 9/1988 | Short et al. . |
| 4,784,592 | 11/1988 | Dromigny . |
| 4,795,597 | * 1/1989 | Whiteley et al. ..................... 264/511 |
| 4,902,557 | 2/1990 | Rohrbacher . |
| 4,913,760 | 4/1990 | Benson et al. . |
| 4,976,896 | 12/1990 | Short et al. . |

(List continued on next page.)

FOREIGN PATENT DOCUMENTS

| 472 960 | 5/1969 | (CH) . |
| 19 15 388 | 10/1969 | (DE) . |

(List continued on next page.)

*Primary Examiner*—Jan H. Silbaugh
*Assistant Examiner*—Edmund H. Lee
(74) *Attorney, Agent, or Firm*—Larry I. Shelton

(57) ABSTRACT

A method and apparatus for manufacturing a film coated article by placing a pre-molded film into a loading station. The film has a decorative surface and a backing surface. The decorative surface is positioned juxtaposed the loading station. The film is transferred to a loader. The loader is positioned juxtaposed the backing surface. The loader and film are positioned in an open mold press between a cavity and a core. The film is transferred from the loader to the cavity. The decorative surface of the film is positioned juxtaposed the cavity. The cavity mates with the film and retains the film in position during the molding operation. The press is closed and a polymeric material is injected against the backing surface of the film. The polymeric material produces a molded article having a rigid substrate fused to the backing of the film and displaying the decorative surface. The press is opened and the molded article is transferred from the cavity to an unloader. The decorative surface of the article is positioned juxtaposed the unloader. The molded article is transferred to an unloading station and the unloader releases the molded article.

6 Claims, 4 Drawing Sheets

U.S. PATENT DOCUMENTS

| | | |
|---|---|---|
| 5,034,077 | 7/1991 | Pata . |
| 5,034,269 | 7/1991 | Wheeler . |
| 5,037,680 | 8/1991 | Papendick et al. . |
| 5,055,346 | 10/1991 | Rohrbacher . |
| 5,114,789 | 5/1992 | Reafler . |
| 5,125,994 | 6/1992 | Harasta et al. . |
| 5,192,609 | 3/1993 | Carroll, Jr. . |
| 5,208,081 | 5/1993 | Gübitz et al. . |
| 5,215,811 | 6/1993 | Reafler et al. . |
| 5,215,826 | 6/1993 | Shimanski et al. . |
| 5,248,364 | 9/1993 | Liu et al. . |
| 5,271,352 | 12/1993 | Wilson . |
| 5,342,666 | 8/1994 | Ellison et al. . |
| 5,350,473 | 9/1994 | Weder et al. . |
| 5,415,536 * | 5/1995 | Ohno ................................ 425/126.1 |
| 5,435,865 | 7/1995 | Lee et al. . |
| 5,514,427 | 5/1996 | Ellison et al. . |
| 5,520,876 * | 5/1996 | Dobler ............................. 425/126.1 |
| 5,536,539 | 7/1996 | Ellison et al. . |
| 5,538,576 | 7/1996 | Knop et al. . |
| 5,585,187 | 12/1996 | Shinonaga et al. . |
| 5,597,433 * | 1/1997 | Dyble et al. .......................... 156/203 |
| 5,599,608 | 2/1997 | Yamamoto et al. . |

FOREIGN PATENT DOCUMENTS

| | | |
|---|---|---|
| 20 45 932 | 3/1972 | (DE) . |
| 42 35 769 | 4/1994 | (DE) . |
| 0 042 782 | 12/1981 | (EP) . |
| 0 161 589 | 11/1985 | (EP) . |
| 0285071 | 10/1988 | (EP) . |
| 0361823 | 4/1990 | (EP) . |
| 0499676 | 8/1992 | (EP) . |
| 0 510 414 | 10/1992 | (EP) . |
| 0642910 | 3/1995 | (EP) . |
| 0 764 513 | 3/1997 | (EP) . |
| 0779141 | 6/1997 | (EP) . |
| 2 210 504 | 7/1974 | (FR) . |
| 2 575 961 | 7/1986 | (FR) . |
| 2 606 702 | 5/1988 | (FR) . |
| 2 699 888 | 7/1994 | (FR) . |
| 2 185 708 | 7/1987 | (GB) . |
| 2 249 749 | 5/1992 | (GB) . |
| 61-148016 | 7/1986 | (JP) . |
| 2-102011 | 7/1990 | (JP) . |
| 3-034811 | 2/1991 | (JP) . |
| 4-185309 | 10/1992 | (JP) . |
| 5-057744 | 7/1993 | (JP) . |
| 5-131496 | 9/1993 | (JP) . |
| 9-193189 | 7/1997 | (JP) . |

* cited by examiner

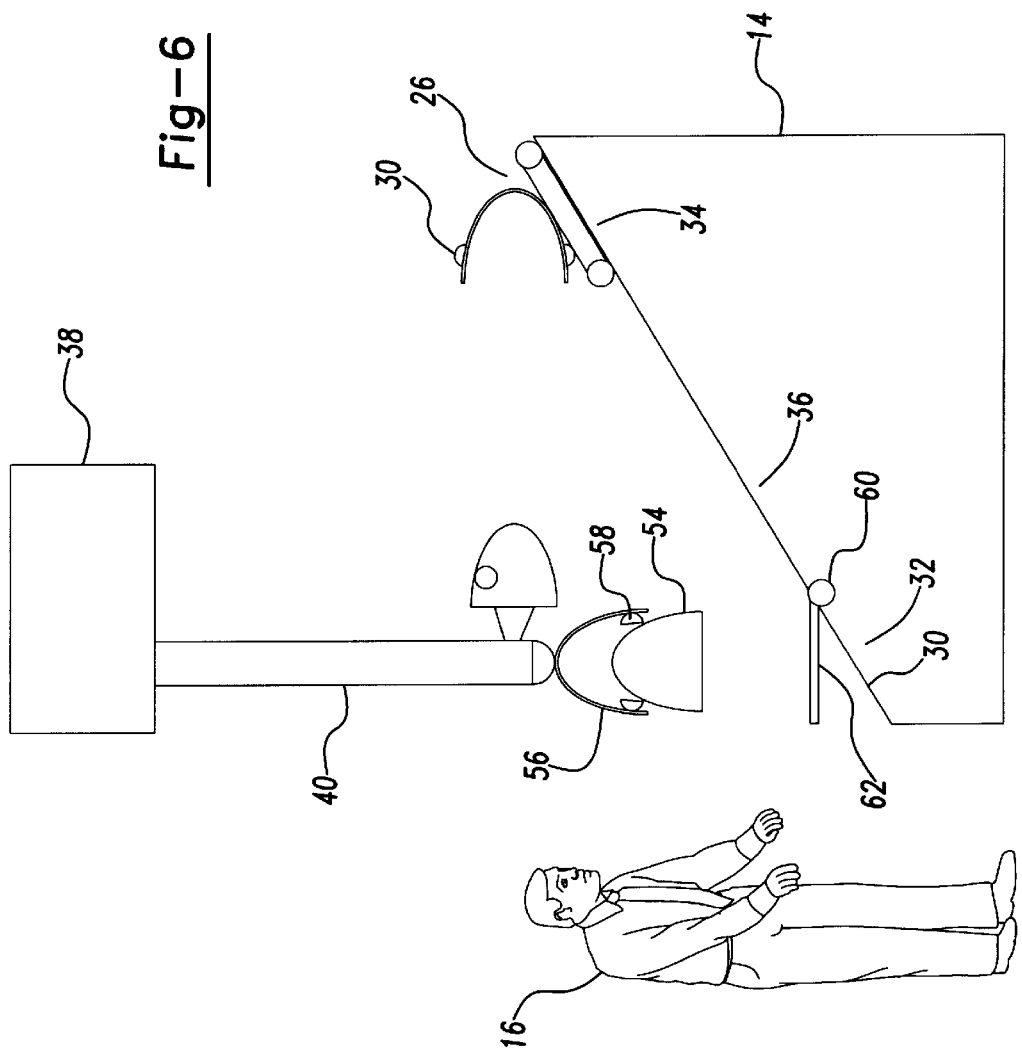
Fig-6
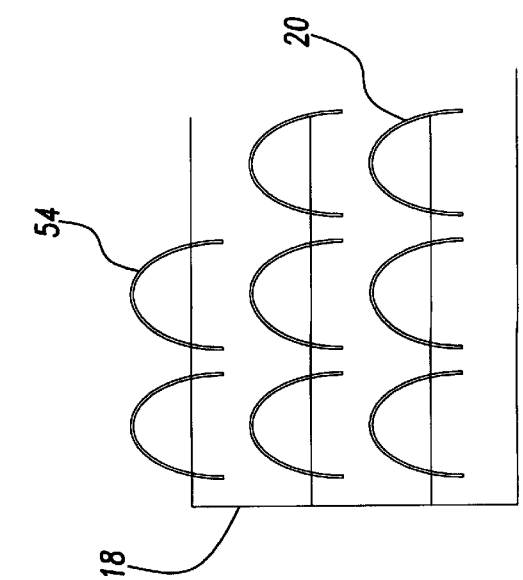

METHOD OF MANUFACTURING A FILM COATED ARTICLE

BACKGROUND OF THE INVENTION

1. Field of the Invention

The present invention relates to a method and apparatus for loading a pre-molded film into a mold. More specifically, the invention relates to a method and apparatus that enables the high speed loading and unloading of large automotive size components into an injection molding machine.

2. Description of the Related Arts

In-mold mold film laminates have been manufactured using movable molds and stationary cores as illustrated in U.S. Pat. No. 3,668,034('034). The '034 patent teaches placing a decorative laminate within a mold and then injection molding a polymeric material behind the laminate. The polymeric material heats, softens and finally fuses to the backing on the laminate.

The finished article includes a rigid substrate of a polymeric material and an exterior surface that displays the decorative laminate. Heretofore, methods for manufacturing molded articles having this type of decorative surface have required hand placement of the laminate within the tool prior to molding. Hand placement requires that the operator have direct access to the molding surfaces. These surfaces are not always accessible, especially when molding larger parts as commonly used in the automotive industry. It is desirable to automate the process by providing an apparatus that automatically loads the film into the mold press. A difficulty arises when attempting to automate the process of transferring the film into the mold because the film is flexible and may be damage by folding or scuffing in robotic equipment that manipulates the film.

Earlier automation relating to film handling usually involves handling the film prior to its thermoforming. The film handling occurs when the film is still in a sheet form. The flat sheets are easily manipulated by the film handling equipment. A problem arises in handling this film after it has been thermoformed into the shape of the finished article. The film displays a highly contour shape with three-dimensional surfaces that generally lack attachment points for film handling equipment. Further, it is necessary to handle the film by the decorative surface. The decorative surface is easily damaged because it is not rigid or self-supporting.

If the film is not properly transferred to the molding press, it may be either damaged or display a wrinkled appearance after molding. Properly positioning the film in the mold has been a significant impediment to the wide spread use of film transfers in large-molding applications. Conventional mold presses are encapsulated in closed off areas and are not accessible to the equipment operator. These presses require that a robotically controlled arm remove the article. It is desirable that the robotically controlled arm normally used to remove the molded articles from a mold be modified to include a mechanism that enables the arm to transfer a pre-molded film into a mold. It is further desirable that the robotically controlled arm accept the film for transfer into a mold and dispense the finish molded articles to the same location so that one equipment operator may both supply the molding press with pre-molded film and remove finished molded articles. It is a further desirable that the cycle time for manufacturing a film-coated article be approximately the same cycle time of manufacturing an article without a film coating.

These deficiencies and problems are overcome by the present invention.

SUMMARY OF THE INVENTION

The present invention relates to a method of manufacturing a film-coated article by the following steps. A pre-molded film is placed into a loading station. The film has a decorative surface and a backing surface. The decorative surface is positioned juxtaposed the loading station. The film is transferred to a loader. The loader is positioned juxtaposed the backing surface. The loader and film are positioned in an open mold press between a cavity and a core. The film is transferred from the loader to the cavity. The decorative surface of the film is positioned juxtaposed the cavity. The cavity mates with the film and retains the film in position during the molding operation. The press is closed and a polymeric material is injected against the backing surface of the film. The polymeric material produces a molded article having a rigid substrate fused to the backing of the film and displaying the decorative surface. The press is opened and the molded article is transferred from the cavity to an unloader. The decorative surface of the article is positioned juxtaposed the unloader. The molded article is transferred to an unloading station and the unloader releases the molded article.

In addition to method described above, the present invention also includes an apparatus for transferring the pre-molded film to the press and removing the finished molded article. The apparatus includes a loading station that receives a pre-molded film. The film has a decorative surface and a backing surface. A first retainer within the loading station retains the decorative surface of the film. The robotic loader is secured to a moveable end of a robotically controlled arm. The loader has a second retainer that contains the backing surface of the film. A mold press being moveable between open and closed positions receives the loader and film between the open cavity and core. The film is placed against the cavity with the decorative surface position juxtaposed the cavity. A polymeric resin is injected between the film and backing and forms a molded article displaying the decorative surface. An unloader attached to the moveable end has a third retainer retaining the decorative surface of the article. The unloader unloads the molded article from the core and the arm moves the molded article to an unloading station.

The invention enables a single operator to both load and unload a mold press from a single location. The robotically controlled loader enables the use of thin flexible films that are not rigid or self-supporting to be accurately positioned within a cavity. Accurately positioning these thin films within the cavity is critical to manufacturing a film-coated article without flaws. By enabling the use of thin films, the invention produces large molded articles that are lighter and lower cost than articles produced with rigid or self-supporting films.

The present invention enables an automated film-loading process by providing an apparatus that automatically loads the flexible film into the mold press. A robotically controlled arm normally used to remove the molded articles from a mold has been modified to include a mechanism that enables the arm to transfer a pre-molded film into a mold. The robotically controlled arm accepts the film for transfer into a mold and dispenses the finish molded articles to the same location so that one equipment operator may both supply the molding press with pre-molded film and remove finished molded articles. By using the same arm to both load the film into the mold and remove the finished molded article from the core while the press is open, the cycle time needed to mold a film-coated article is approximately the same cycle time of manufacturing an article without a film coating.

These and other desired objects of the present invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 6 is a side view of the robotically controlled arm transferring the molded article from the unloader to an unloading station.

DETAILED DESCRIPTION OF THE PREFERRED EMBODIMENTS

The present invention will be described through a series of drawings, which illustrates a molding operation that molds a thin film into an automotive fascia. Other components may be manufactured using the same or similar technique and equipment and are included within the invention described herein.

Figure 1:
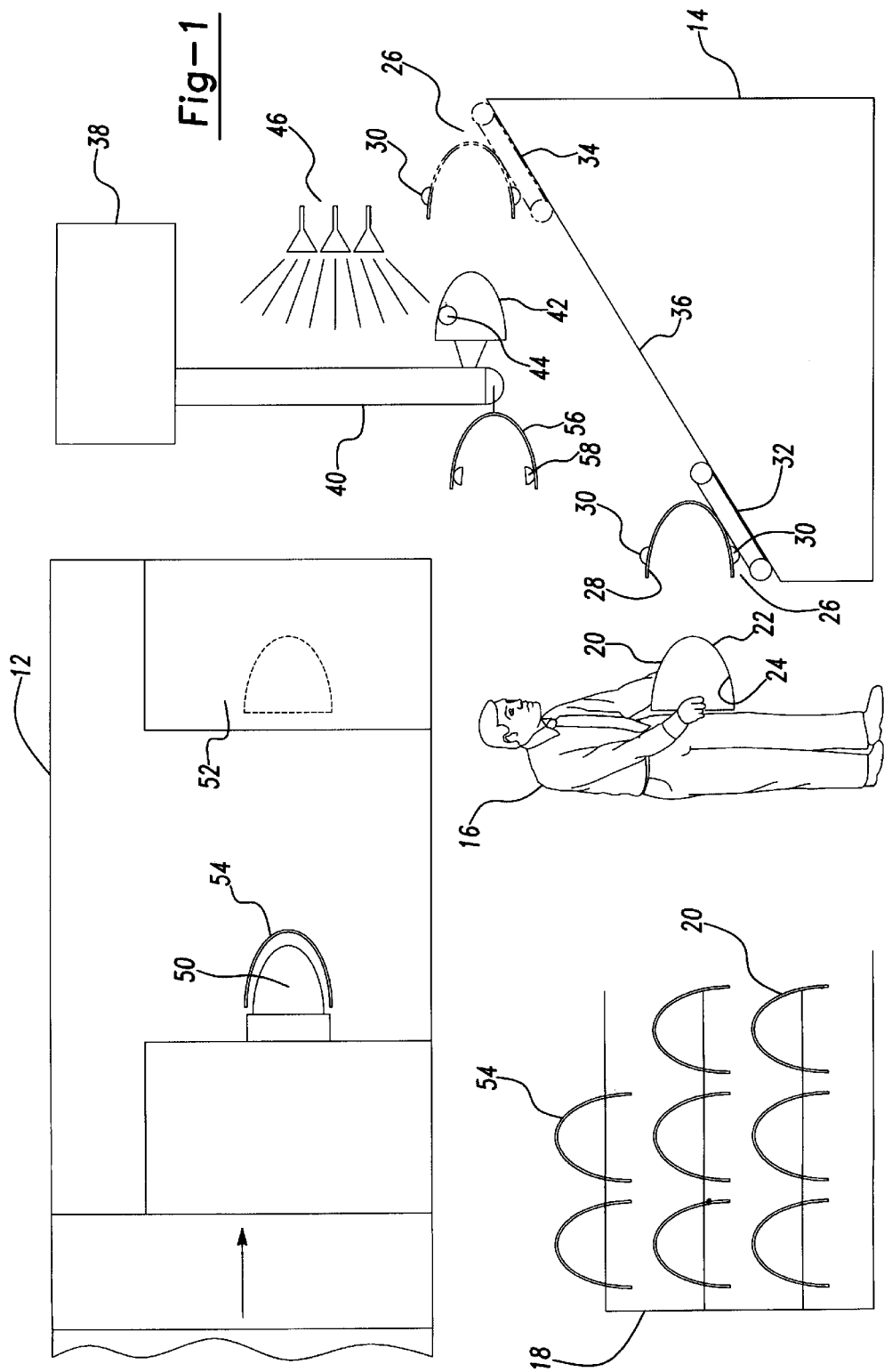
FIG. 1 is a side view of a mold press and robotically controlled arm useful in the present invention.

FIG. 1 illustrates a side view of a film transfer molding area 10. The area 10 includes a horizontal molding press 12, which is of a generally commercially available construction and design and is commonly used for manufacturing large automotive components such as fascias. Positioned adjacent the molding press 12, is an inclined transfer station 14. An operator 16 loads the film into the transfer station and receives finished molded articles. A rack 18 provides a supply of transfer films and receives the finished molded article.

As will be more fully described below, the operator 16 places a pre-molded film 20 into the transfer station 14. The pre-molded film 20 is made from a flat sheet using a thermoform press (not shown) that forms the film into the shape of the final molded article. The pre-molded film 20 has a thickness of between 0.19–35 mils and may be made from a number of thermoformable materials. Materials specifically preferred for automotive bumper fascia applications are films such as Avloy™ manufactured by Avery Dennison and ISF™ manufactured by 3M/Rexam. Materials used for interior trim applications include polyvinyl chloride and thermoplastic urethanes. The pre-molded film 20 has a decorative surface 22 and a backing surface 24. The decorative surface 22 is painted to match the exterior colors of a vehicle. The decorative surface 22 includes both the base coat and a clear coat coating. The base coat may be either a solid or metallic color. The backing surface 24 may simply be the resin used for manufacturing the film 20 or may optionally include a material that promotes adhesion with the molded article.

The operator 16 places a film 20 into a loading station 26. The loading station 26 has a surface 28 is shaped to mate with the decorative surface 22 of the film 20. Vacuums 30 are automatically activated when the film 20 is placed within the loading station 26. The operator places the film 20 within the loading station 26 and aligns various geometric features of the film 20 with mating features on the surface 28. The operator 16 smoothes out any wrinkles or creases and unfolds the film 20 so that it completely covers the surface 28. After the loading station 26 receives the film 20, the operator initiates a molding cycle. The loading station 26 moves from an loading position 32 to an unloading position 34 along an incline 36. As will be further described below, the operator may receive a finished article while the loading station 26 is in the unloading position 34.

A robotically controlled arm 38 includes a moveable end 40. Secured to the moveable end 40, is a loader 42. The loader 42 receives the film 20 from the loading station 26. The surface of the loader 42 mates with the decorative 22 of the film 20. Vacuum ports 44 on the loader 42 are activated and the vacuum ports 30 on the loading station 26 are deactivated so that the film 20 is transferred from the loading station 26 to the loader 42. The end 40 withdraws the film 20 from the loading station 26 and moves it to a blow-off station 46.

The blow-off station 46 is located between the unloading position 34 and the mold press 12. Air sprayers 48 supply a stream of pretreated air to reduce the static buildup on the film 20 and to blow-off and dust or debris on the decorative surface 22. After the anti-static blow-off station 46, the arm 38 is moved to the molding press 12. The molding press 12 includes a moveable core 50 and a stationary cavity 52.

As will be described in greater detail and illustrated in FIGS. 2–6, the loader 42 transfers the film 20 to the cavity 52. The cavity 52 is shaped to mate with the decorative surface 22. The core 50 is moved against the cavity 52 and a plastic or polymeric resin is injected between the film 20 and the core 50. After the plastic resin hardens, the core 50 is moved away from the cavity 52 and a finished molded article 54 is retained on the core 50. The arm 38 includes an unloader 56 attached to the arm 38. The unloader 56 includes the vacuums 58 to retain the molded article 54.

The arm 38 moves the molded article 54 to an unloading station 60 positioned above the loading position 32. The unloading station 60 includes two swingable arms 62 that swing downwardly and clear of the loading station 26 when the loading station 26 is in the loading position 32. When the loading station 26 is in the unloading position 34, arms 62 swing upwardly and receive the molded article 54 from the unloader 56.

Figure 2:
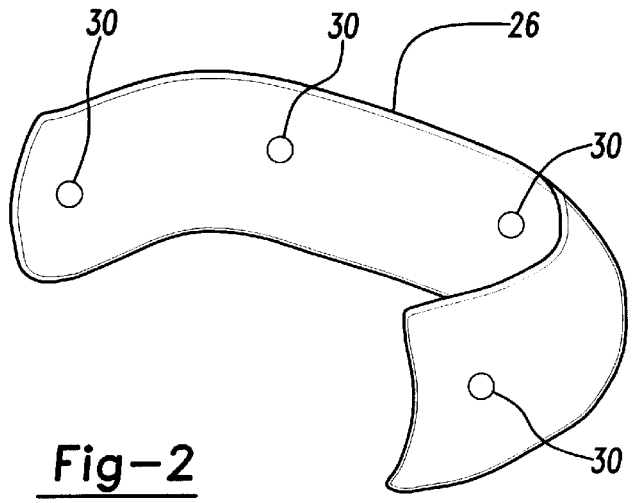
FIG. 2 is a perspective view of a loading station.
Figure 3:
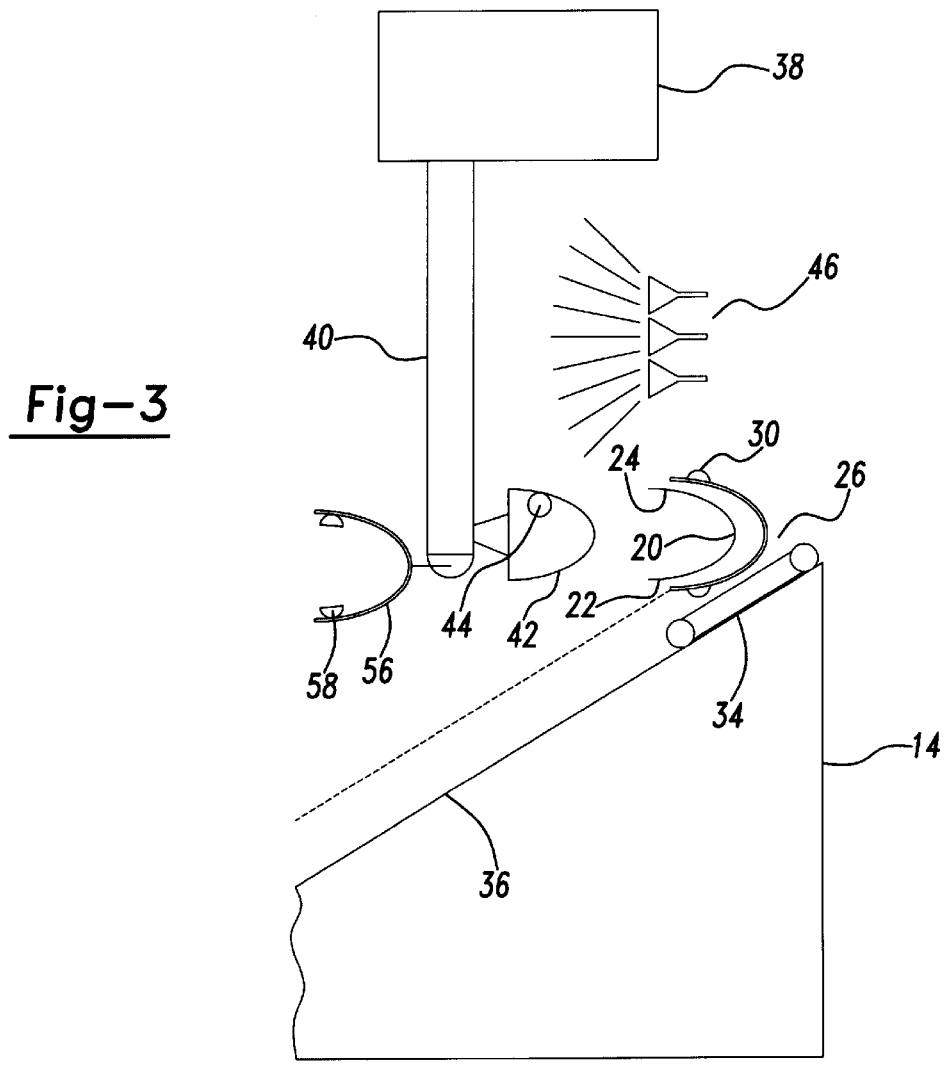
FIG. 3 is a side view of a robotically controlled arm having a loader receiving a film from the loading station.

FIGS. 2–6 illustrate the various components of the overall systems illustrated in FIG. 1. FIG. 2 is a perspective view of the loading station 26. The surface of the loading station 26 is formed to mate with the film 20. The operator 16 places the film 20 within the loading station 26 and registers the various geometric features of the film 20 with mating features on the loading station 26. The vacuum ports 30 apply a vacuum when the operator 16 places the film 20 within the loading station 26. The vacuum serves to retain the film 20 within the loading station 26 and to smooth out any wrinkles or creases in the film 20.

The loading station 26 is moved along the incline 36 to the unloading position 34. The decorative surface 22 of the film 20 is retained within the loading station 26. A loader 42 is rigidly secured to the end 40. The arm 38 positions the loader 42 to receive the film 20. As the loader 42 is moved within the loading station 26, a vacuum is applied to the vacuum ports 44. The vacuum is withdrawn from the vacuum ports 30 and the film 20 is transferred from the loading station 26 to the loader 42. The loading station 26 is moved to the unloading position 34 and away from the operator 16. The loading station 26 is moved along an incline 36 to elevate the loading station 26 and reduce the amount of movement in arm 38. The transfer station 14 may be compacted by making the relative position between loading and unloading positions 32, 34 vertical.

Figure 4:
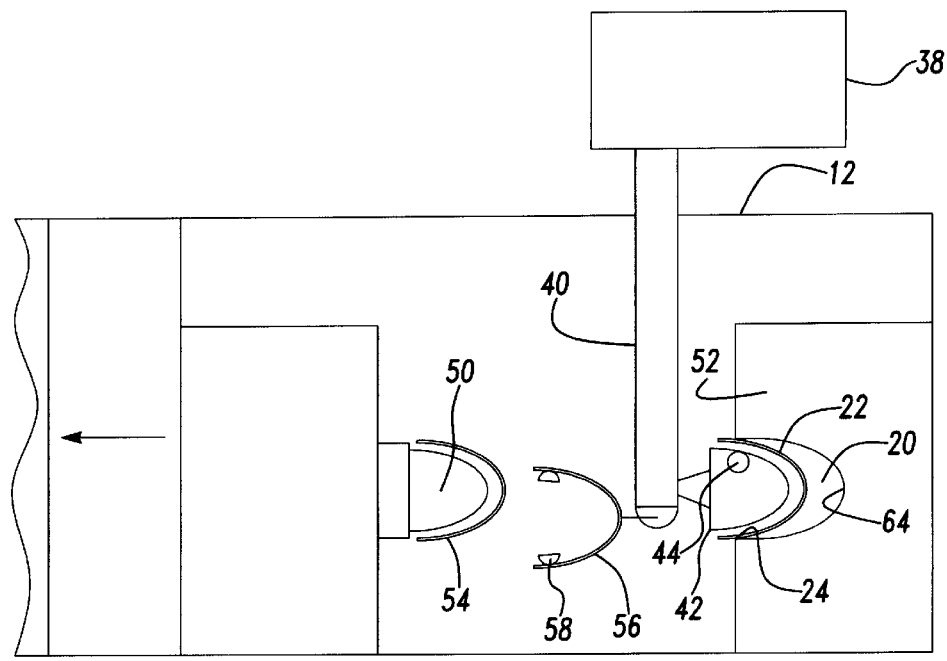
FIG. 4 is a side view of a robotically controlled arm transferring film from the loader to the mold.
Figure 5:
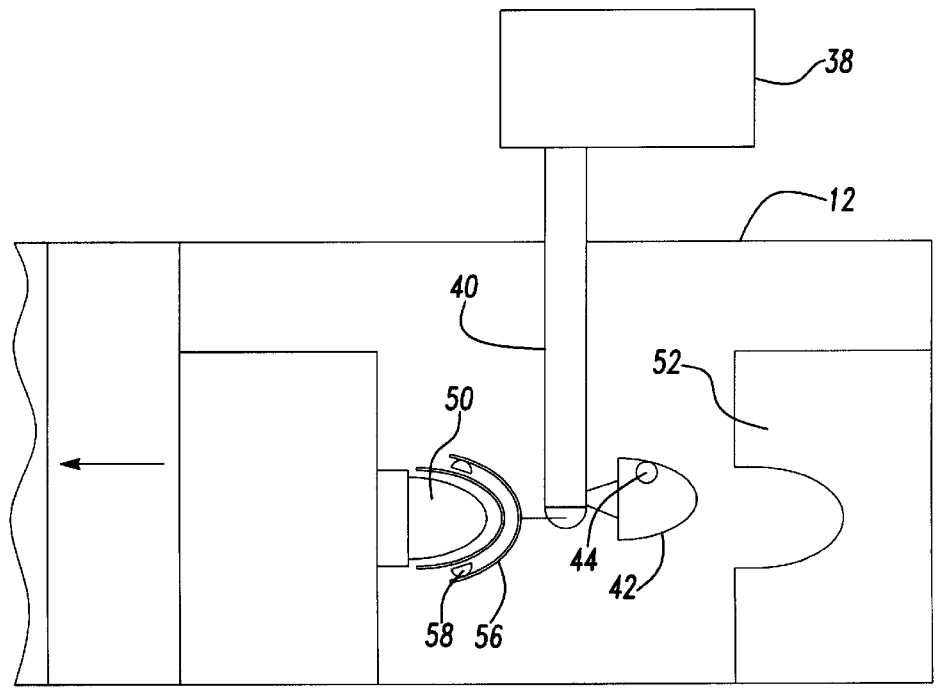
FIG. 5 is a side view of the robotically controlled arm transferring the molded article from the core to the unloader.

After the loader 42 passes the anti-static blow-off station 46, the loader 42 is moved between the core 50 and the cavity 52 as illustrated in FIGS. 4 and 5. The end 40 positions the loader 42 within the cavity 52. The cavity 52 mates with the film 20 and forms the final shape of the molded article 54. The decorative surface 22 of the film 20 is position juxtaposed a cavity surface 64. Vacuum is withdrawn from the vacuum ports 44 and a short burst of positive air pressure is blown through the vacuum ports 44 to urge the film 20 to release from the loader 42. Vacuum ports are not needed on the cavity 52 because the film 20 is held in position by the various geometric features on the film 20, which mate with corresponding features on the cavity surface 64.

Arm 38 is moved away from between the core 50 and the cavity 52. The core 50 is moved against the cavity 52 and a quantity of polymer is injected there between. The polymer heats and softens the backing 24 and fuses thereto. After the polymer has sufficiently hardened to form a rigid substrate, the mold core 50 is moved to the open position. As is common in injection molding, the molded article 54 is retained on the core 50 after molding. The arm 38 positions the end 40 between the core 50 and the cavity 52. The unloader 56 is moved against the molded article 54. Vacuum is applied to vacuum ports 58 to lift the molded article 54 off of the core 50.

In a continues molding operation, the arm 38 positions the end 40 between the cavity 52 and the core 50 while the core 50 and the cavity 52 are in the open position and transfers a film from the loader 42 to the cavity 52. After the first cycle has produced a molded article, the unloader 56 removes the molded article 54 from the core 50 while the core 50 and the cavity 52 are still in the open position. Therefore, after the first molding cycle, each placement of the arm 38 between the cavity 50 and the core 52 serves to both transfer a pre-molded film to the cavity 52 and to remove a finished molded article from the core 50.

After the unloader 56 receives a molded article 54, the arm 38 moves the end 40 to the unloading station 60. The arms 62 are raised to receive the molded article 54. Vacuum is removed from the vacuum ports 58 and the molded article 54 is transferred to the unloading station 60. The operator 16 transfers the molded article 54 to the rack 18 as illustrated in FIG. 1.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. A method of manufacturing a film coated article comprising the steps of:

providing a pre-molded thin flexible film having a decorative surface and a backing surface, said pre-molded thin flexible film having a three-dimensional shape;

moving a loading station to a first position accessible to an operator;

after said moving step, placing said pre-molded three-dimensional thin flexible film into said loading station and smoothing said pre-molded three-dimensional thin flexible film so that there are no wrinkles in said pre-molded three-dimensional thin flexible film, said decorative surface juxtaposed and mating with said loading station, said loading station retaining said pre-molded three-dimensional thin flexible film in an unwrinkled state;

after said placing step, moving said loading station from said first position to a second position, said second position being located above said first position and freeing said first position to receive said article;

after moving said loading station, transferring said pre-molded three-dimensional thin flexible film from said loading station to a robotically controlled loader, said loader juxtaposed and mating with said backing surface, said loader retaining said pre-molded three-dimensional thin flexible film in an unwrinkled state;

after transferring said pre-molded three-dimensional thin flexible film to said loader, positioning said loader and said pre-molded three-dimensional thin flexible film between an open mold press, said press having a cavity and a core;

after said positioning step, transferring said pre-molded three-dimensional thin flexible film from said loader to said cavity, said decorative surface juxtaposed and mating with said cavity, said cavity retaining said Pre-molded three-dimensional thin flexible film in an unwrinkled state;

closing said press and injecting a polymer material against said backing surface to produce the film coated article having a rigid substrate of the injected polymer material fused to said backing and displaying said decorative surface;

opening said mold and transferring said article to an unloader, said decorative surface juxtaposed said unloader;

transferring said molded article to an unloading station positioned near said first position while said loading station is in said second position; and releasing said molded article from said unloader at said unloading station.

2. A method of manufacturing a film coated article in a cavity of a molding press comprising the steps of:

providing a pre-molded thin flexible film having a decorative surface and a backing surface, said pre-molded thin flexible film having a first three-dimensional shape;

moving a loading station to a first position accessible to an operator;

after said moving step, placing said pre-molded three-dimensional thin flexible film into said loading station and smoothing said pre-molded three-dimensional thin flexible film so that there are no wrinkles in said pre-molded three-dimensional thin flexible film, said pre-molded three-dimensional thin flexible film having a decorative surface and a backing surface, the loading station having a second three-dimensional shape mating with said first three-dimensional shape;

after said placing step, moving said loading station to a second position and freeing said first position to receive the film coated article;

providing a robotically controlled loader;

after moving said loading station, transferring said pre-molded three-dimensional thin flexible film from said loading station to said loader, said loader juxtaposed said backing surface and having a third three-dimensional shape mating with said first three-dimensional shape, said loader retaining said pre-molded three-dimensional thin flexible film in an unwrinkled state;

after transferring said pre-molded three-dimensional thin flexible film to said loader, positioning said loader and pre-molded three-dimensional thin flexible film between an open mold press, said press having a cavity and a core, said cavity having a fourth three-dimensional shape mating with said first three-dimensional shape;

after said positioning step, moving said loader to position said pre-molded three-dimensional thin flexible film within said cavity;

after moving said loader, transferring said pre-molded three-dimensional thin flexible film from said loader to said cavity, said decorative surface juxtaposed said cavity, said cavity retaining said pre-molded three-dimensional thin flexible film in an unwrinkled state;

closing said press and injecting a molten plastic material that forms a rigid substrate against said backing surface to produce said molded article having said substrate fused to said backing and displaying said decorative surface;

opening said mold and transferring said molded article to a robotically controlled unloader, said decorative surface juxtaposed said unloader; and transferring said molded article to an unloading station near said first position, and releasing said molded article from said unloader at said unloading station.

3. The method of claim 2, wherein said unloading station is positioned near said loading station first position and said transferring step to the unloading station occurs when said loading station is in said second position.

4. The method of claim 2, wherein said second position is located above said first position.

5. The method of claim 2, further comprising retaining said film on said loading station by vacuum.

6. The method of claim 2, further comprising retaining said film on said loader by vacuum.

* * * * *